Jan. 11, 1966  H. F. EDWARDS  3,228,245
LIQUID QUANTITY GAGE
Filed March 2, 1962
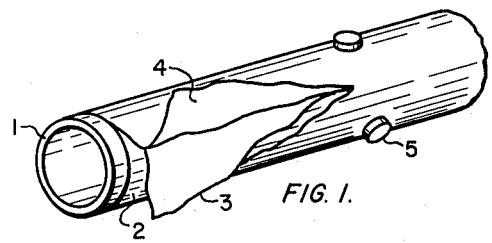
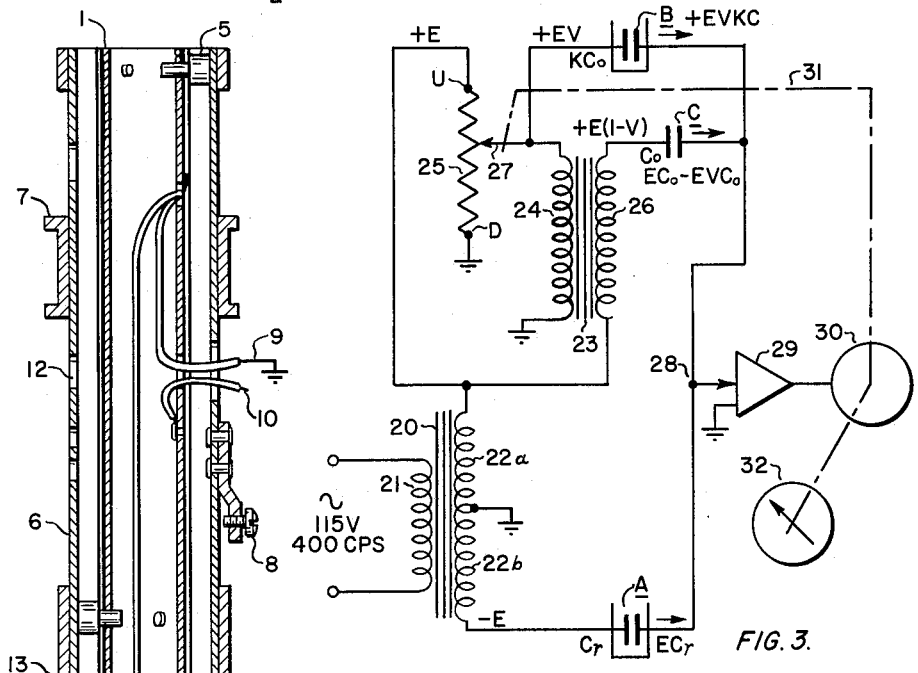
INVENTOR.
HARRISON F. EDWARDS
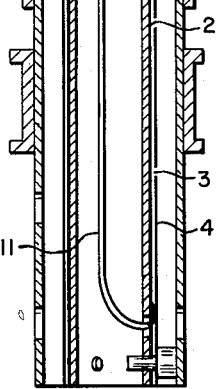

United States Patent Office 3,228,245
Patented Jan. 11, 1966

3,228,245
LIQUID QUANTITY GAGE
Harrison F. Edwards, Ferrisburg, Vt., assignor to Simmonds Precision Products, Inc., Tarrytown, N.Y., a corporation of New York
Filed Mar. 2, 1962, Ser. No. 176,937
5 Claims. (Cl. 73—304)

The present invention relates generally to liquid quantity gage systems, more particularly to an improved gage of the capacitance type, adapted to measure the quantity of liquid in an aircraft tank unit or other liquid container.

In measuring the quantity of liquid contained in a tank, it is known to make use of a sensing capacitor having tubular spaced electrodes immersed in the tank, the fluid to be measured occupying more or less of the electric field space between the electrodes, depending upon the amount of liquid present. The dielectric constant of the liquid is different from that of air, hence the capacitance of the tank capacitor will vary with the level of the liquid in the tank.

In a liquid quantity measuring system of the capacitance type, it is essential that a correct indication of the quantity of liquid contained in a tank be obtained, irrespective of the dielectric properties of the liquid. Since, for a given liquid of nominal dielectric properties, there may be changes in these properties due to contamination, lack of uniformity from one batch to another and other variables, the gage must be capable of giving a correct indication over the full range of variations which may be encountered.

One of the present problems encountered in liquid quantity gaging in aircraft has been the accumulation of green slime on the active areas of the sensing capacitor which is immersed in the fuel or liquid. This accumulation of green slime has seriously affected the capacitance of the sensing capacitor and has resulted in substantial error in the measurement of the quantity of fuel or liquid.

In view of the foregoing, it is the principal object of this invention to provide an efficient and reliable liquid gage of the capacitance type adapted to indicate the quantity of liquid to be measured.

More specifically, it is an object of this invention to provide a compensated liquid measuring system of the capacitance type wherein the indications are substantially independent of variations in the dielectric properties of the liquids to be measured to produce indications of high accuracy.

Briefly stated, these objects are accomplished by using a wet reference capacitor (compensator) which is always immersed in the liquid and a sensing capacitor (tank unit) which is profiled to produce a capacitance change proportional to the quantity of liquid in the tank and its dielectric properties. Since the compensator is always immersed, its capacitance change will depend only on the dielectric properties of the liquid. By properly combining these elements in a bridge circuit, a gage indication is obtained which will depend only on the amount of immersion of the tank unit and, therefore, on the quantity of liquid in the tank.

For a better understanding of the invention as well as other objects and further features thereof, reference is had for the following description to be read in conjunction with the accompanying drawings, wherein like components in the various views are identified by like reference numerals.

FIGURE 1 illustrates an exploded view of the various elements which make up one embodiment of the inner electrode of the sensing probe, in accordance with the invention;

FIGURE 2 illustrates a cross-sectional view of one embodiment of a sensing probe, in accordance with the invention; and FIGURE 3 illustrates a schematic diagram of a basic form liquid quantity measuring gage in accordance with the invention.

Referring now to the drawings and more particularly to FIG. 1, there is shown the inner electrode 1 of a sensing probe or tank unit which is inserted in the liquid to be measured. Inner electrode 1 is usually made of a metallic substance such as aluminum or steel. An insulating coat 2 is placed completely around inner electrode 1. This insulating coat 2 may consist of a material such as nylon, Teflon or Kel-F, any one of which may be readily obtained commercially. Over the insulating coat 2 there is placed a conductive layer 3 which is patterned in accordance with the profiling requirements of the aircraft tank unit. As aircraft tank units are not necessarily linear, a means must be provided to enable the system to give a linear reading. By a suitable design of the shape of the conductive layer, in relation to the shape of the liquid container, the indicating device of the gage may be calibrated linearly in terms of quantity of liquid. More specifically, if the width of the conductive layer at any height along the tube is made proportional to the surface area of the liquid in the container at that height then, if the indicating device of the gage follows a linear law as regards change in capacitance, the indicating device may be calibrated to show linearly change in the quantity of liquid in the container. This technique is well known in the aircraft instrument industry and need not be explained in detail in describing the present invention. This conductive layer 3 can be placed on the insulating coat or layer 2 by means of a photographic or silver screen process. It can also be made up of metal foil and placed in firm contact over the conductive layer 3.

There is placed over conductive layer 3 another insulating coat or layer 4. This coat 4 completely envelopes the inner electrode 1 and can consist of the same material which makes up the substance of insulating coat 2. Spacers 5 are next placed on top of insulating coat 4 and are so distributed as to be always over the profiled area 3. These spacers 5 are made of an insulating material.

Referring now to FIG. 2, there is shown an assembled sensing probe consisting essentially of inner electrode 1 and outer electrode 6. Outer electrode 6 is made up of a metallic material such as aluminum or steel. Inner electrode 1 is separated from outer electrode 6 by means of insulating spacers 5. Flanges 7 and 13 are placed around outer electrode 6 to assist in the installation of the sensing probe in the aircraft fuel tank. The outer electrode 6 is electrically connected to a 400 cycle power supply by means of connector 8. The conductive area 3 is directly connected to ground by means of lead 9. The inner electrode 1 is connected to the High potential of the circuit by means of lead 10.

Lead 11 illustrates the grounding of the conductive area 3 throughout its entire length. In order to prevent stratification of the fuel or liquid in the sensing probe apertures 12 are provided. These apertures 12 allow easy access of the liquid between electrodes 1 and 6, thereby providing good mixing of the liquid.

In previous systems the conductive area 3 has been the active area and the other area 1 has been grounded. By reversing these leads the present invention has eliminated serious error in the system which has been caused by contamination of the sensing probe with green slime. This green slime has been accumulating around the insulating spacers in the probe. As previous systems have had the majority of insulating spacers placed over the active areas, this has substantially affected the capacitance reading of the sensing probe. In the present system, the insulating spacers 5 are now all placed on the grounded conductive area 3. As the conductive area in sensing probes of this sort will cover a much greater area of the electrode than the active area, it is possible to place practically all of the insulating spacers on the grounded conductive area. This provides sufficient mechanical strength to the structure and keeps the active area free from contact with interfering elements. The problem of any collection of green slime then disappears, as the green slime will then collect around the spacers on the conductive area and not on the active area. The collection of contaminants such as green slime around the spacers 5 does not cause capacitance error in the present invention.

The simplicity of the construction of the sensing probe allows for an economical unit which can be easily made and which gives high accuracy in its indication of the quantity of fuel or liquid to be measured.

Referring now to the drawings and more particularly to FIG. 3, the liquid quantity gage for liquid comprises a tank condenser unit A and a wet reference or compensating condenser B. Condenser A is normally immersed in the liquid in the tank being gaged, and is provided with two electrodes in spaced relation, the liquid in the tank acting as a dielectric therebetween whereby the resultant capacitive value is determined by the level of liquid in the tank.

Condenser B is fully submerged in the liquid being measured or in a representative sample thereof so that its capacitive value does not change with liquid level and is determined by the dielectric properties of the liquid. Also provided is a dry reference condenser C which has a fixed capacitance value. For simplicity, this capacitance value may be the same as the compensating condenser B when not submerged. Thus the difference in capacitance between the dry and wet condensers will be determined by the dielectric constant of the liquid being tested.

The tank unit A is preferably of concentric tube construction and is so profiled relative to liquid level as to produce capacitive and conductance changes proportional to the quantity of liquid in the tank and its dielectric properties whereby linear dial indications are obtained.

The condensers A, B and C are operatively arranged in a bridge circuit including a voltage step-up transformer 20 having a primary winding 21 which is connected to a suitable source of alternating-current and a center-tapped secondary winding forming upper and lower sections 22a and 22b producing output voltages of equal magnitude and opposing phase, the center tap being grounded. Also provided is a phase inverter in the form of a one-to-one ratio transformer 23 whose primary 24 is connected through an adjustable potentiometer 25 across secondary section 22a the voltage induced in secondary winding 26 being determined by adjustment of the potentiometer wiper arm 27.

When the wiper arm 27 is at its extreme upper position U the full voltage derived from section 22a is imposed on the primary of phase inverter transformer 23, so that developed in the secondary 26 thereof is an alternating voltage of equal magnitude but opposite phase. Section 22a is connected serially with secondary 26 and the dry reference condenser B to the node terminal 28 relative to ground, whereby at the wiper position U, the transformer voltages effectively cancel each other and substantially no current passes through condenser C.

At the extreme down position D of wiper 27, no voltage is applied to the primary 24 of transformer 23, hence the full output of section 22a passes through secondary 26 and condenser C to node terminal 28. At intermediate positions of the wiper, the resultant voltage applied through condenser C depends on the adjusted ratio of voltage from section 22a and that from secondary 26.

The wet compensator condenser B is connected between wiper 27 and the node terminal 28, hence at the upper position U the full output from section 22a is applied therethrough, whereas at the lower position D no voltage is applied. Thus an inverse relationship exists between condensers B and C as the wiper position is adjusted, and as the applied voltage to one condenser increases, the voltage applied to the other condenser decreases.

The phase reversing operation effected by transformer 23 may also be carried out by known vacuum tube or transistor means in a phase inverter arrangement, the wiper adjustment of the potentiometer 25 acting to vary a bias voltage on the transistor or vacuum tube to vary the output voltage.

The section 22a of transformer 20 and the associated transformer 26 and condensers B and C constitute the upper branch of the bridge circuit, the lower branch being constituted by section 22b whose output is applied to the node terminal 28 through the tank unit A. The current flow through the upper branch is the resultant of the impedance offered by the dry and wet capacitors D and C, while the current flow in the lower branch which is in phase opposition to the upper branch is determined by the impedance of tank unit A. When the upper and lower branch currents are of equal intensity, they cancel at node terminal 28, this being the condition of bridge balance.

The error voltage developed at node terminal 28 as a result of bridge unbalance is fed through an amplifier 29 whose output is applied as a control voltage to a servomotor device 30 of any suitable design. Motor 30 is operatively coupled through a gear train or other mechanical means, represented by dashed line 31, to wiper 27, whereby in response to the error voltage the wiper is caused to shift in a direction and to an extent restoring bridge balance.

An indicator 32 is coupled to motor 30 and is calibrated to indicate the extent and direction of wiper displacement effecting a bridge null. Thus in operation as the tank becomes depleted, the wiper will continue to shift to re-establish a null and thereby provide an indication of the liquid quantity.

We shall now briefly consider the derivation and analysis of the basic gaging circuit shown in FIG. 3.

The equation for the capacitance of a profiled tank unit A as a function of dielectric constant and fuel quantity is:

$$C_T = C_0 + VC_0(K-1) \quad (1)$$

where:

$C_T$ = tank capacitance
$C_0$ = tank unit empty capacitance
$V$ = fraction of full quantity
$K$ = dielectric constant of fuel The tank unit is assumed hereto to have negligible "dead" capacitance. "Dead" capacitance is defined as that capacitance arising in the sensing electrodes from insulating materials which are not replaced by the liquid. These may be due to coatings, insulated supports, or stray capacitance in the head of the tank unit.

Solving Equation (1) for V gives:

$$V = \frac{(C_T - C_0)}{(K-1)C_0} \quad (2)$$

It is to be noted that V is a normalized quantity which can be converted to required units by the use of appropriate scale factors.

Equation (2) can be rewritten as:

$$VKC_0 - VC_0 - C_T + C_0 = 0 \quad (3)$$

To obtain an equation for the currents at a node terminal 28 in a bridge circuit, Equation (3) is multiplied by an A, C, reference voltage E giving:

$$EVKC_0 - EVC_0 - EC_T + EC_0 = 0 \quad (4)$$

Equation (4) is the required bridge equation if an indication of liquid quantity is required.

The bridge circuit shown in FIG. 3 has the following basic information inputs:

(1) A capacitance change directly proportional to the dielectric constant of the fuel. This is provided by the wet reference capacitor B (compensator) which is always immersed in fuel.

(2) A capacitance change proportional to the dielectric constant and quantity of fuel in the tank. This is provided by the tank unit A.

As pointed out previously, the position assumed by wiper 27 when the bridge is automatically balanced is directly proportional to fuel quantity. From a theoretical viewpoint, the bridge circuit illustrated in FIG. 3 is capable of giving an accurate indication of fuel quantity independent of the dielectric constant of the fuel.

Where there has been shown what are considered to be preferred embodiments of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A capacitance type gage for immersion in an irregularly shaped container for a dielectric liquid to measure variations in the quantity of the liquid comprising in combination, two tubular electrode members of different diameters, spacer means for mounting said members in spaced relation to each other, the first of said members comprising a metallic material having a part only of a surface thereof a conductive layer, said conductive layer being insulated from said first member and being irregularly shaped and so related to the shape of the container that the circumferential extent of said layer at any given depth of liquid is proportional to the surface area of the liquid at that depth, the second of said electrode members comprising a tube of metallic material placed around the first of said members and said conductive layer being electrically connected to ground potential with the remaining surface of said first member being electrically connected to a high impedance potential source so that said spacers are mounted on said conductive area thereby eliminating the accumulation of contaminant on the surface of the first member which is electrically connected to said high impedance potential source.

2. A capacitance type gage for immersion in an irregularly shaped container for a dielectric liquid to measure variations in the quantity of the liquid comprising in combination two tubular electrode members of different diameters, insulating means for mounting said members in spaced relation to each other, the first of said members comprising a metallic tube having a part only of its outer surface thereof a conductive layer, said conductive layer being insulated from said first member and being irregularly shaped and so relative to the shape of the container that the circumferential extent of said layer at any given depth of liquid is proportional to the surface area of the liquid at that depth, the second of said electrodes comprising a metallic tube being placed around the first of said members and said conductive layer being electrically connected to ground potential with the remaining surface of said first member being electrically connected to a high impedance potential source so that said insulating means are mounted on said conductive layer thereby eliminating the accumulation of contaminant on the surface of the first member which is electrically connected to said high impedance potential source.

3. In a liquid measuring system for determining the quantity of liquid in a tank in which a sensing capacitor is immersed in said tank, said sensing capacitor comprising in combination two electrode members of different diameters, insulating means for mounting said members in spaced relation to each other, the first of said members comprising a tube of metallic material having on a part only of a surface thereof a conductive surface, said conductive surface being insulated from said first member and being irregularly shaped and so related to the shape of the container that the circumferential extent of said layer at any given depth of liquid is proportional to the surface area of the liquid, at that depth, the second of said electrode members comprising a tube of metallic material placed around the first of said members, said sensing capacitor responsive to the level of liquid therein to provide a first capacitance value which is a function of the dielectric constant of said liquid and the quantity thereof in said tank, a wet compensator capacitor immersed in a predetermined quantity of said liquid to provide a second capacitive value which is a function of said dielectric constant and is independent of said quantity, a dry reference capacitor providing a third and fixed capacitive value, a bridge current comprising said capacitors and provided with a first branch having adjustable means to apply a first alternating voltage through said wet and dry capacitors in inverse relationship whereby an increase in the voltage applied to said wet capacitor results in a decrease in the voltage applied to the dry capacitor, and a second and parallel branch to apply a second alternating voltage opposed to said first voltage to said sensing capacitor whereby developed across said parallel branches is an error voltage reflecting the degree of bridge unbalance, means responsive to said error voltage to shift said adjustable means in a direction and to an extent restoring bridge balance, an indicator responsive to the setting of said adjustable means, and said conductive layer being electrically connected to ground potential with the remaining surface of said first member electrically connected to a high impedance potential source so that said insulating means are practically all mounted on said conductive area thereby eliminating the accumulation of contaminants on the surface of the first member which is electrically connected to said high impedance potential source.

4. A gage for measuring a liquid in a container comprising, a rebalancing bridge providing first and second voltage sources of opposite polarity with respect to ground, first capacitance means coupled to a first of said bridge sources and defining a current path for a first bridge current, the capacitance of said means being a function of liquid dielectric and the amount of liquid in said container, said first capacitance means comprising electrodes mounted in spaced relation to each other by insulating means and extending into said container having on one of said spaced electrodes a conductive layer reposed thereof which is electrically insulated therefrom, a rebalancing potentiometer coupled to the second of said sources and having a movable wiper adapted to provide a wiper voltage with respect to ground corresponding to a proportionate part of said second voltage second capacitance means coupled to said wiper for defining a current path for a second bridge current proportional to said wiper voltage, the capacitance of said second means for providing a bridge balancing signal corresponding to a difference signal between said first and second bridge currents and means responsive to said bridge balancing signal for repositioning said wiper in a direction to vary wiper voltage, wherein said second bridge current is charged to rebalance the bridge and said conductive layer being electrically connected to ground potential with the remaining surface of said electrode being electrically connected to a high impedance potential source so that said insulating means are mounted on said conductive area thereby eliminating the accumulation of contaminants on the surface of the electrode which is electrically connected to said high impedance potential source.

5. In a capacitance type gage for immersion in an irregularly shaped container for a dielectric liquid, two coaxial tubular electrode members having different diameters, spacer means disposed between said members, one of said members comprising a metallic material having a part only of a surface thereof a conductive layer, means insulating said conductive layer from said one electrode member, said conductor layer being irregularly shaped and related to the shape of the container such that the circumferential extent of said layer at any given depth of liquid is proportional to the surface area of the liquid at that depth, said conductive layer further being connected to ground potential with the remaining portion of said metallic material electrically connected to a high impedance potential source and said spacer means being confined to that area overlying said conductive layer.

References Cited by the Examiner

UNITED STATES PATENTS

| | | | |
|---|---|---|---|
| 2,769,338 | 11/1956 | Hermanson | 73—304 |
| 2,945,165 | 7/1960 | Franzel | 73—304 |
| 2,950,426 | 8/1960 | Frome | 73—304 |
| 3,022,665 | 2/1962 | Smith | 73—304 |
| 3,025,201 | 3/1962 | Ponemon | 317—246 |
| 3,079,797 | 3/1963 | Hermanson | 73—304 |

FOREIGN PATENTS

| | | |
|---|---|---|
| 752,699 | 7/1956 | Great Britain. |
| 836,614 | 6/1960 | Great Britain. |

ISAAC LISANN, C. C. ELLS, *Assistant Examiners.*

LOUIS R. PRINCE, *Primary Examiner.*